United States Patent
Matuzaki et al.

[11] 3,749,459
[45] July 31, 1973

[54] ANTIFRICTION BEARING ASSEMBLY FOR ELECTRIC MOTORS

[75] Inventors: Tetuo Matuzaki; Toshio Nakamura; Hitoshi Egawa, all of Hitachi, Japan

[73] Assignee: Hitachi, Ltd., Tokyo, Japan

[22] Filed: Nov. 19, 1971

[21] Appl. No.: 200,473

[30] Foreign Application Priority Data
Dec. 2, 1970 Japan..........................45/105865

[52] U.S. Cl. ............................................. 308/187
[51] Int. Cl. ................................................ F16c 33/66
[58] Field of Search ................................. 308/187

[56] References Cited
UNITED STATES PATENTS
3,637,270  1/1972  Johnson ............................. 308/187
3,663,077  5/1972  Nakamura et al. ................. 308/187

Primary Examiner—Charles J. Myhre
Assistant Examiner—Frank Susko
Attorney—Craig, Antonelli & Hill

[57] ABSTRACT

A worn grease containing chamber is formed in an outside bearing cover of an antifriction bearing, which chamber extends horizontally towards a peripheral portion thereof and opens to an axial outside portion of the antifriction bearing. The bottom portion of the worn grease containing chamber inclines towards the lowest inner surface of the outer race of the antifriction bearing. The height of the lowest surface of the bottom portion of the worn grease containing chamber is selected to be at least even with or higher than that of the lowest surface of the inner surface of the outer race.

13 Claims, 8 Drawing Figures

INVENTORS

TETUO MATUZAKI, TOSHIO NAKAMURA,

HITOSHI EGAWA

BY Craig, Antonelli & Hill

ATTORNEYS

INVENTORS
TETUO MATUZAKI, TOSHIO NAKAMURA,
HITOSHI EGAWA
BY Craig, Antonelli + Hill
ATTORNEYS

INVENTORS
TETUO MATUZAKI, TOSHIO NAKAMURA,
HITOSHI EGAWA
BY Craig, Antonelli + Hill
ATTORNEYS

ANTIFRICTION BEARING ASSEMBLY FOR ELECTRIC MOTORS

BACKGROUND OF THE INVENTION

This invention relates to an antifriction bearing assembly for electric motors, which is able to operate at prolonged intervals without the need for new grease and is particularly suitable for use in electric locomotive motors.

Grease for antifriction bearing assemblies used in a dusty and/or humid environment has to be refilled or exchanged at short intervals and therefore the assemblies have to be disassembled at short intervals for cleaning and maintaining the same. To maintain these antifriction bearing assemblies in good working order, frequent supplies of grease and disassembling of the assemblies are required, which requires a great deal of work. Some conventional bearing assemblies have been provided with a worn grease container near the bearing of the assemblies to increase the grease exchange interval and also the disassembling interval of the assemblies; however, the bottom plane or surface of these worn grease containers are arranged far below the lowest portion of the outer race of the bearing to facilitate draining of the worn grease.

Grease for lubricating the bearing essentially consists of a base oil and a carrier, such as a soap component or other material capable of thickening or increasing the consistency of the oil, however only the base oil effects a lubrication of the bearing. In this regard, it was found that a great deal of the base oil still remains in the grease in the worn grease container of the conventional assembly. However, the conventional relative arrangement between the bearing and the worn grease container as described above does not permit the use of the remaining base oil therein. Further, it has been additionally found that a significant portion of the new grease supplied to the assembly which is to be used for lubrication of the bearing is pushed into the worn grease container through the grease supply; consequently, this grease is not used effectively. As a result of these facts, the frequent grease supplies and the disassembling of the bearing assemblies for maintaining the bearing assemblies in a good operating condition have been essential in spite of the provision of the worn grease container in the bearing assemblies.

SUMMARY OF THE INVENTION

One object of the present invention is to provide an antifriction bearing assembly for an electric motor in which grease for lubricating the bearing is used up effectively.

Another object of the present invention is to provide an antifriction bearing assembly for an electric motor having prolonged grease supply intervals.

Still another object of the present invention is to provide an antifriction bearing assembly for an electric motor having prolonged disassembling intervals.

A further object of the present invention is to provide an antifriction bearing assembly for an electric motor which facilitates the required maintenance and inspection work thereon.

Still a further object of the present invention is to provide an antifriction bearing assembly for an electric motor which facilitates grease exchanging and draining operations thereon.

In the antifriction bearing assemblies for electric motors, and more particularly in the ball or roller bearing assemblies of the present invention, a worn grease containing chamber is formed on an outer bearing cover of the bearing assemblies extending continuously from an annular outer grease holding chamber toward the outer periphery of the outer bearing cover. The bottom plane of the worn grease containing chamber is constituted so as to bring back the remaining base oil in the worn grease containing chamber onto an inner surface of an outer race of the bearing.

In other words, the bottom plane of the worn grease containing chamber is inclined toward the lowest plane of the inner surface of the outer race of the bearing, and the extremity of the bottom plane, i.e. the lower side plane of the worn grease containing chamber, is positioned to be at least even with or higher than the lowest plane of the inner surface of the outer race of the bearing, so that the remaining base oil in the worn grease containing chamber flows out onto the inner surface of the outer race of the bearing along the bottom plane of the worn grease containing chamber.

DESCRIPTION OF THE PREFERRED EMBODIMENTS

Figure 1:
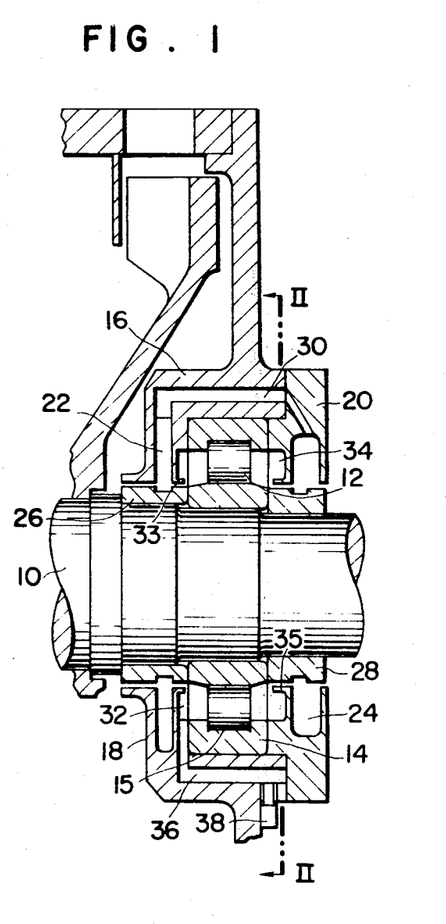
FIG. 1 is a sectional side view of one embodiment of the present invention.
Figure 2:
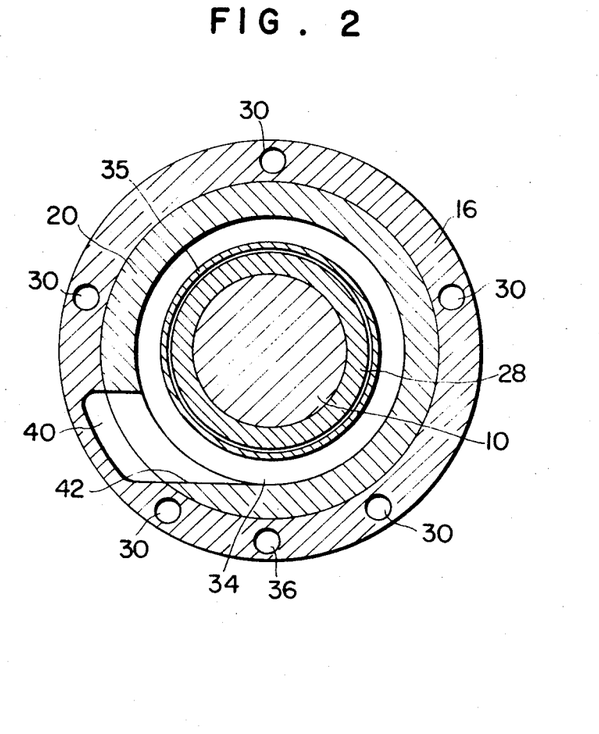
FIG. 2 is a sectional view taken along line II — II of FIG. 1.
Figure 3:
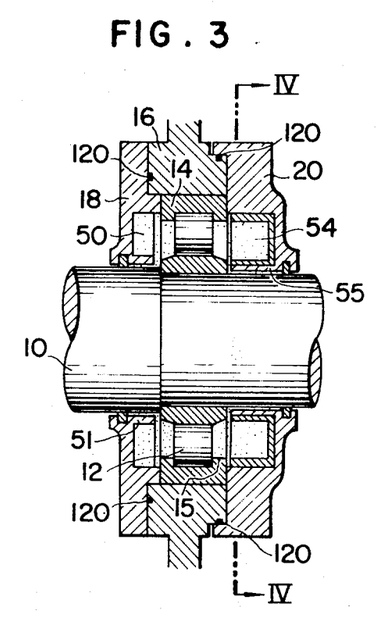
FIG. 3 is a sectional side view of another embodiment of the present invention.
Figure 4:
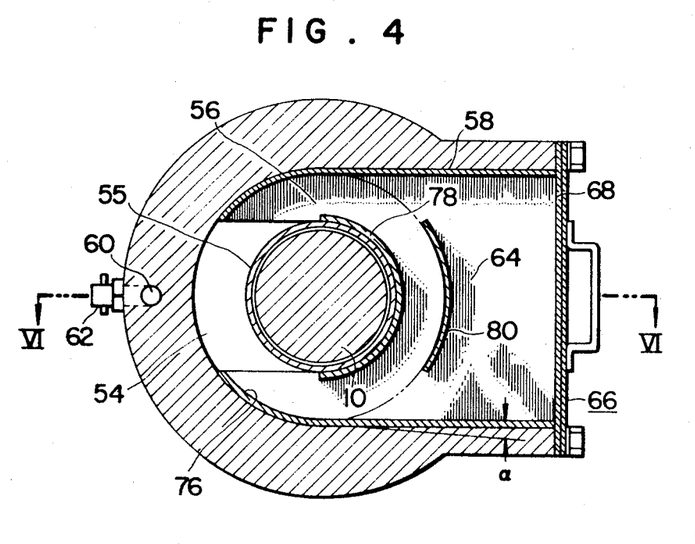
FIG. 4 is a sectional view taken along line IV—IV of FIG. 3.
Figure 5:
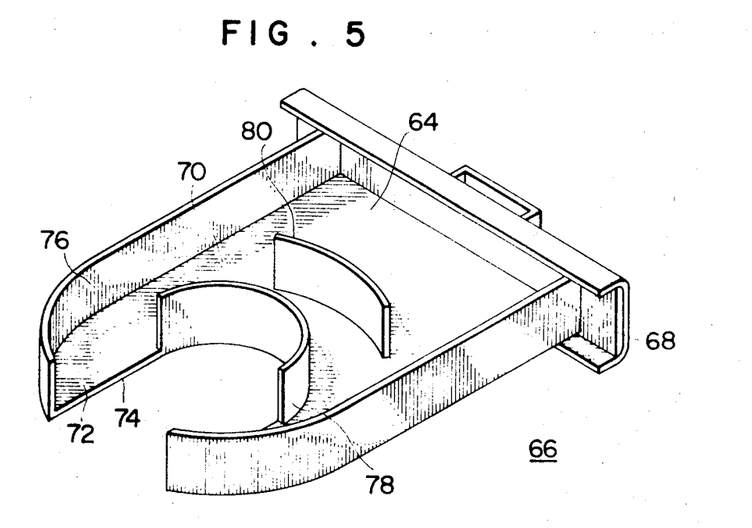
FIG. 5 is a perspective view of the grease holding case used with the embodiment of the present invention shown in FIGS. 3 and 4.

In FIGS. 1 and 2, a rotary shaft 10 is supported by a roller bearing 12 which consists of an annular inner race 11 secured over the rotary shaft 10, an annular outer race 14 disposed concentrically with the inner race 11 with a predetermined annular space therebetween and a plurality of bearing rollers arranged in the annular space. The roller bearing 12 is supported by an end bracket 16 of an electric motor housing. An inner bearing cover 18 is constituted integrally with the end bracket 16 and separates the roller bearing 12 from the inner part of the electric motor. An outer bearing cover 20 covers the outer axial side portion of the roller bearing 12.

U-shaped cross-sectional annular air chambers 22 and 24 are formed along inner circumferential surfaces of the inner bearing cover 18 and the outer bearing cover 20, respectively. The inner race 11 of the roller bearing 12 is axially fixed between an inner sleeve 26 and an outer sleeve 28 on the shaft 10 with the outer circumferential surface of the inner sleeve 26 and outer sleeve 28 being arranged so as to face the respective opening of the U-shaped cross-sectional annular air chambers 22 and 24, which are in communication through air passage 30.

On the inside surface of the inner bearing cover 18 facing the inner axial side portion of the roller bearing 12, an inner U-shaped cross-sectional annular grease holding chamber 32 is with an opening which faces the annular space formed between the inner and outer race 14 of the roller bearing 12. Similarly, on the inside surface of the outer bearing cover 20 facing the outer axial side portion of the roller bearing 12, an outer U-shaped cross-sectional annular grease holding chamber 34 is formed with an opening which also faces the annular space formed between the inner and outer race 14 of the roller bearing 12. The inner and outer U-shaped cross-sectional annular grease holding chambers 32 and 34 are separated from the rotary shaft 10 through the inner and outer circumferential walls 33 and 35 thereof, respectively.

Grease supplied through a grease supply tube 38 and a grease supply passageway 36 at first enters into the inner grease holding chamber 32, and then flows to the outer grease holding chamber 34 through clearance between the bearing rollers in the annular space between the inner and outer race. A worn grease containing chamber 40 is formed on the side of the outer bearing cover 20 facing the roller bearing 12 and extends continuously from the outer grease holding chamber 34 substantially horizontally in the direction towards the circumferential periphery of the outer bearing cover 20 and tangential to the shaft 10. The bottom plane 42 of the worn grease containing chamber 40, which extends uninterruptedly from the lowermost circumferential surface of the outer grease holding chamber 34, is slightly inclined toward the lowermost inner circumferential surface of the outer race 14, and the height of the lowest point of the bottom plane 42 is at least even with or higher than that of the lowermost inner circumferential surface 15 of the outer race 14. As a result, all of the remaining base oil forced into the worn grease containing chamber 40 together with the soap component of the worn grease as a result of the supplying of new grease through the grease supply tube 38 and grease supply passageway 36 with a grease gun, returns to the inner surface 15 of the outer race 14 and is utilized for lubrication of the roller bearing. The bearing assembly described above is assembled after filling the annular space between the inner race and the outer race 14 of the roller bearing 12 with new grease and at the same time forcing grease into both the inner and outer grease holding chambers 32 and 34.

When the electric motor is running, the atmospheric air pressure inside the electric motor is usually slightly lower than that of the outside, so that the air at the outside enters into the inside of the electric motor through a clearance between the outside bearing cover 20 and the outer sleeve 28; however, the air from the outside flows through the outer annular air chamber 24, the air passages 30, the inner annular air chamber 22 and the clearance between the inner bearing cover 18 and the inner sleeve 26, rather than through the more restricted outer grease holding chamber 34 and the inner grease holding chamber 32. Consequently, the contamination of the grease through dust and humidity in the outer air and also the leakage of the grease into the inside of the electric motor are prevented.

In FIGS. 3, 4, 5 and 6, the same numerals are used as in FIGS. 1 and 2 to show the same parts as in those Figures. On the inside surface of the inner axial side portion of the roller bearing 12 of this embodiment, an inner U-shaped cross-sectional annular grease holding chamber 50 is formed with its opening facing the annular space formed between the inner and outer races of the roller bearing 12. Similarly, on the inside surface of the outer bearing cover 20 facing the outer axial side portion of the roller bearing, an outer U-shaped cross-sectional annular grease holding chamber 54 is formed with its opening facing the annular space formed between the inner and outer race of the roller bearing 12. The inner and outer annular grease holding chambers 50 and 54 are separated from the rotary shaft 10 through the inner and outer circumferential walls 51 and 55 thereof, respectively. From the outer annular grease holding chamber 54 a grease draining chamber 58 extends horizontally to the circumferential outer periphery of the outer bearing cover, the width of which is the same as the diameter of the outer grease holding chamber 54.

Figure 6:
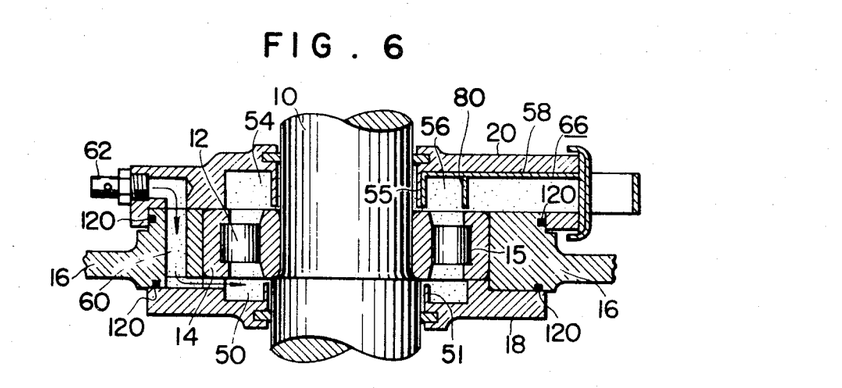
FIG. 6 is a sectional view taken along line VI—VI of FIG. 4.

As will be seen from FIG. 6, grease is supplied through a grease supply passageway 60 formed in the outer bearing cover 20, end bracket 16 of the motor housing and the inner bearing cover 18. The inner end of the passageway 60 is opened to the inner annular grease holding chamber 50 and the outer end thereof is attached to a grease nipple 62. A grease holding case 66 is attached in the inner grease holding chamber 54 to the grease draining chamber 58 through the opening thereof. The grease holding case 66 comprises a main plate 70, an edge wall 76 formed along the periphery of the main plate to perpendicular to the surface thereof and a cover plate 68 with a handle. At the top 72 of the main plate 70, a U-shaped cut-out 74 is formed to position the grease holding case 66 properly with respect to the outer grease holding chamber 54 and the grease draining chamber 58 so as to keep the used grease out of the circular space defined by the circumferential wall 55. A grease holding wall 78 is formed along the bottom periphery of the U-shaped cut-out 74 facing the circumferential wall 55.

A partition wall 80 extending in the same direction from main plate 70 as the edge wall 76 and the grease holding wall 78 and formed on the main plate 70 along approximately the same inner circle line of the outer race 14 separates the grease holding case 66 into two portions, one portion being the grease holding portion 56 and the other being a worn grease holding portion 64. Packing rings 120 are provided between the inner bearing cover 18 and the bracket 16 and the outer bearing cover 20 and the bracket 16 for preventing leakage of the grease. The bottom edge wall 76 of the grease holding case inclines in accordance with the inclination of the bottom plane of the grease draining chamber 58 with an angle of $\alpha$ with respect to the horizontal line. The angle $\alpha$ is generally selected below 5°. The height of the lowermost portion of the bottom edge wall 76 is arranged to be at least even with or higher than that of the lowest portion of the inner plane of the outer race 14. As a result, the remaining base oil forced into the worn grease holding portion 64 of the grease holding case 66 together with the soap component of the worn grease flows back over the inner surface 15 of the outer race as has been explained in connection with the embodiment of FIGS. 1 and 2.

After the electric motor has run for a predetermined period, new grease is supplied under pressure through the grease nipple 62, the grease is pushed into the inner grease holding chamber 50 through the grease supply passageway 60, as shown by the arrows in FIG. 6. The worn grease in the inner grease holding chamber 50, the annular space of the roller bearing 12 and the outer grease holding portion 56 of the grease holding case 66 is pushed out into the worn grease holding portion 64 through the openings formed between the edge wall 76 and the respective end portions of the partition wall 80, and all worn grease in the roller bearing 12 and both inner and outer grease holding portions 50 and 56 is replaced by the newly supplied grease.

After repeating the grease supply procedure as explained above several times and when the worn grease holding portion 64 of the grease holding case 66 has become full, the grease holding case 66 is pulled out from the grease holding and draining chambers 54 and 58 and inspected, then the worn grease in the worn grease holding portion 64 of the case 66 is disposed of and the case 66 is cleaned. After supplying a small amount of new grease in the grease holding portion 56, the case 66 is inserted into the grease holding and draining chambers 54 and 58. As a result, the disassembling of the bearing assembly is eliminated and the maintenance work for the bearing assembly is reduced. Further, the grease exchanging and draining tasks accomplished through the extraction of the case 66 can be performed even during the operation of the electric motor. In addition, since the case 66 is arranged so as to be extracted and inserted horizontally, the worker can extract or insert the case from a normal posture.

Figure 7:
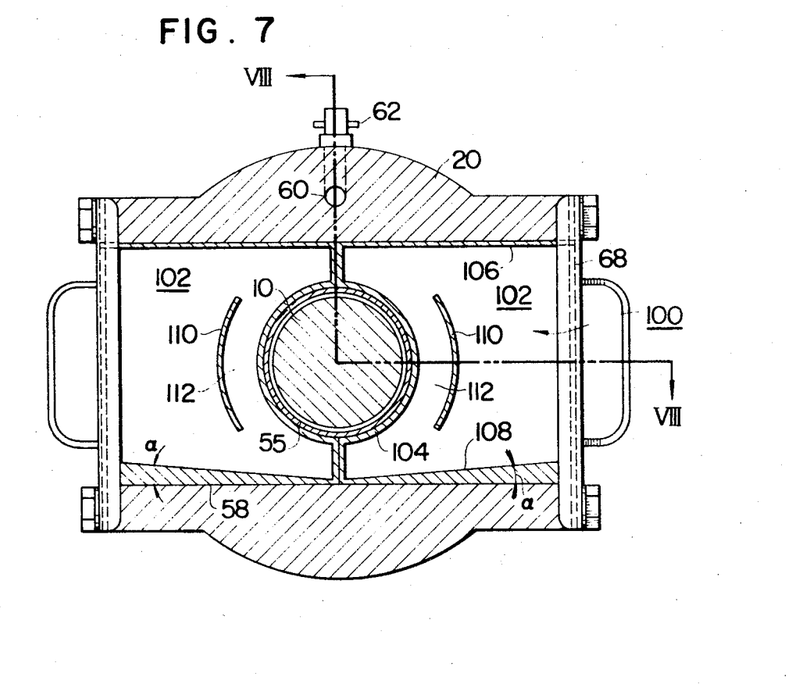
FIG. 7 is a sectional view of still another embodiment of the present invention.
Figure 8:
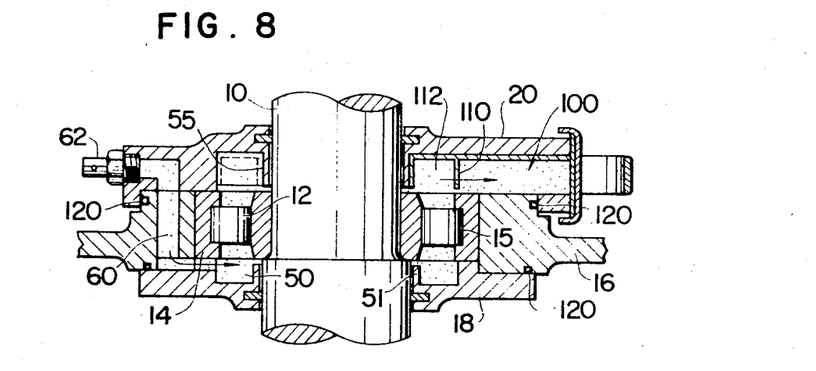
FIG. 8 is a sectional view taken along line VIII—VIII of FIG. 7.

In FIGS. 7 and 8, the same numerals as used in FIGS. 1, 2, 3, 4, 5 and 6 designate the same parts as illustrated in those Figures. The bearing assembly in this embodiment has a pair of grease holding cases 100. The grease draining chamber 58 passes through the outer bearing cover in both directions horizontally and tangentially to the shaft 10. Each case 100 is to be inserted and extracted from the respective end portions of the pass through grease draining chamber 58. Each grease holding case 100 comprises a main plate 102, a side edge wall 106 and bottom edge wall 108, formed along the periphery of the main plate 102 perpendicular to the surface thereof, and a cover plate 68 with a handle, thereby forming a grease container. At the top of the main plate 102, a semicircular wall portion 104 is formed to position the grease holding case 100 in the pass through draining chamber 58 by alignment with the circular space defined by the circumferential wall 55, and thereby a grease holding wall is formed therearound. The bottom edge wall 108 inclines toward the lowermost inner surface 15 of the outer race 14 with an angle of $\alpha$ with respect to the horizontal line. The height of the lowest plane of the bottom edge wall 108 is selected to be at least even with or higher than that of the lowermost inner surface 15 of the outer race 14, the same as the other embodiments which have been explained. A partition wall 110 extending in the same direction as the side edge wall 106, the bottom edge wall 108 and the grease holding wall, and being formed on the main plate 102 along approximately the same inner circle line of the outer race 14, separates the grease holding case 100 into two portions, one portion being a grease holding portion 112 and the other being a worn grease holding portion 114. In this embodiment, since two grease holding cases are provided, the space for the worn grease containing portion is larger than the other embodiments. As a result, the number of times the grease may be supplied can be increased while the number of times the grease holding case need be extracted is decreased.

In the three embodiments described above, the outer end portion of the grease supply passageway to which the grease nipple is attached is positioned at the top of the outer bearing cover; however, if the electric motor is designed to rotate in one direction, it is preferable to shift the position to the direction opposite to the rotation for distributing the supply of grease uniformly in the grease holding portion.

It is further preferable to dispose the circumferential partition walls in the grease holding portion to divide the annular grease holding portion or chamber into a plurality of annular grease holding spaces, when the diameter of the roller bearing is large and the grease in the grease holding portion is forced to the outer peripheral portion thereof by a large centrifugal force.

We claim:

1. An antifriction bearing assembly for electric motors comprising, an antifriction bearing on which a rotary shaft is supported, said antifriction bearing including an inner race secured on said rotary shaft and an outer race disposed concentrically with said inner race with a plurality of rolling elements disposed therebetween;

an inner bearing cover which covers the inner axial side portion of said antifriction bearing;

an outer bearing cover which covers the outer axial side portion of said antifriction bearing;

an inner U-shaped cross-sectional annular grease holding chamber formed in the side of said inner bearing cover facing to said antifriction bearing;

an outer grease holding chamber formed in the side of said outer bearing cover facing to said antifriction bearing;

at least one worn grease containing chamber formed in the same side of said outer bearing cover as said outer grease holding chamber and extending continuously therefrom horizontally and tangentially to said rotary shaft toward the outer periphery of said outer bearing cover, the bottom surface of said worn grease containing chamber being situated so as to apply the remaining base oil therein onto the inner surface of said outer race; and a grease supply passageway having one end which opens into said inner U-shaped cross-sectional annular grease holding chamber.

2. An antifriction bearing assembly as defined in claim 1, wherein the bottom surface of said worn grease containing chamber inclines toward the lowermost inner circumferential surface of said outer race and the height of the lowest portion of said bottom surface is at least even with or higher than that of the lowermost inner circumferential surface of said outer race.

3. An antifriction bearing assembly as defined in claim 2, wherein interconnecting air passage chambers are provided in said inner and outer bearing covers which bypass said bearing to provide a passage for air around said bearing.

4. An antifriction bearing assembly for electric motors comprising, an antifriction bearing on which a rotary shaft is supported, said antifriction bearing including an inner race secured on said rotary shaft and an outer race disposed concentrically with said inner race with a plurality of rolling elements disposed therebetween;

an inner bearing cover which covers the inner axial side portion of said antifriction bearing;

an outer bearing cover which covers the outer axial side portion of said antifriction bearing;

an inner U-shaped cross-sectional annular grease holding chamber formed in the side of said inner bearing cover facing to said antifriction bearing;

an outer grease holding chamber formed in the side of said outer bearing cover facing to said antifriction bearing;

a worn grease containing chamber formed in the same side of said outer bearing cover as of said outer grease holding chamber and extending continuously therefrom horizontally and tangentially to said rotary shaft to the outer periphery of said outer bearing cover, said worn grease containing chamber having an opening on the outer periphery of said outer bearing cover;

a grease holding case disposed in said outer grease holding chamber and said worn grease containing chamber through said opening, said grease holding case being divided into a new grease holding portion and a worn grease holding portion, the bottom edge wall of said grease holding case being formed so as to apply the ramaining base oil in said worn grease holding portion onto the inner surface of said outer race; and a grease supply passageway having one end which opens into said inner U-shaped cross-sectional annular grease holding chamber.

5. An antifriction bearing assembly as defined in claim 4, wherein the bottom edge wall of said grease holding case inclines toward the lowermost outer circumferential surface of said inner race and the height of the lowest portion of the bottom edge wall of said grease holding case is at least even with or higher than that of the lowermost inner circumferential surface of said outer race.

6. An antifriction bearing assembly as defined in claim 4, wherein said grease holding case essentially consists of a main plate, a U-shaped cut-out formed in one end of said main plate so as to accommodate a U-shaped wall of said annular grease holding chamber therein, an edge wall formed around the circumference of said main plate, a grease holding wall formed along the periphery of said U-shaped cut-out and a partition wall which separates said grease holding case into a new grease holding portion and a used grease holding portion.

7. An antifriction bearing assembly as defined in claim 6, wherein the bottom edge wall of said grease holding case inclines toward the lowermost inner circumferential surface of said outer race and the height of the lowest portion of the bottom edge wall of said grease holding case is at least even with or higher than that of the lowermost inner circumferential surface of said outer race.

8. An antifriction bearing assembly for electric motors comprising, an antifriction bearing on which a rotary shaft is supported, said antifriction bearing including an inner race secured on said rotary shaft and an outer race disposed concentrically with said inner race with a plurality of rolling elements disposed therebetween;

an inner bearing cover which covers the inner axial side portion of said antifriction bearing;

an outer bearing cover which covers the outer axial side portion of said antifriction bearing;

an inner U-shaped cross-sectional annular grease holding chamber formed in the side of said inner bearing cover facing to said antifriction bearing;

an outer grease holding chamber formed in the side of said outer bearing cover facing to said antifriction bearing;

two worn grease containing chambers formed in the same side of said outer bearing cover as said outer grease holding chamber and extending continuously therefrom horizontally and tangentially to said rotary shaft to the outer periphery of said outer bearing cover, each of said worn grease containing chamber having an opening on the outer periphery of said outer bearing cover, each said opening being positioned at the opposing circumferential periphery on said outer bearing cover;

a pair of grease holding cases disposed in said outer grease holding chamber and said worn grease containing chamber through each said opening, each said grease holding case being divided into a new grease holding portion and a worn grease holding portion, the bottom edge wall of each said grease holding case being formed so as to apply the remaining base oil in each said worn grease holding portion onto the inner surface of said outer race; and a grease supply passageway having one end which opens into said inner U-shaped cross-sectional annular grease holding chamber.

9. An antifriction bearing assembly as defined in claim 8, wherein the bottom edge wall of each grease holding case inclines toward the lowermost outer circumferential surface of said inner race and the height of the lowest portion of the bottom edge wall of each grease holding case is at least even with or higher than that of the lowermost inner circumferential surface of said outer race.

10. An antifriction bearing assembly as defined in claim 8, wherein said grease holding case essentially consists of a main plate, a U-shaped cut-out formed in one end of said main plate so as to accommodate a U-shaped wall of said annular grease holding chamber therein, an edge wall formed around the circumference of said main plate, a grease holding wall formed along the periphery of said U-shaped cut-out and a partition wall which separates said grease holding case into a new grease holding portion and a used grease holding portion.

11. An antifriction bearing assembly as defined in claim 10, wherein the bottom edge wall of each grease holding case inclines toward the lowermost inner circumferential surface of said outer race and the height of the lowest portion of the bottom edge wall of each grease holding case is at least even with or higher than that of the lowermost inner circumferential surface of said outer race.

12. An antifriction bearing assembly as defined in claim 9, wherein the bottom edge wall of each grease holding case inclines at most at an angle of 5°.

13. An antifriction bearing assembly for electric motors comprising, an antifriction bearing on which a rotary shaft is supported, said antifriction bearing including an inner race secured on said rotary shaft and an outer race disposed concentrically with said inner race with a plurality of rolling elements disposed therebetween;

an inner bearing cover which covers the inner axial side portion of said antifriction bearing;

an outer bearing cover which covers the outer axial side portion of said antifriction bearing;

an inner U-shaped cross-sectional annular grease holding chamber formed in the side of said inner bearing cover facing to said antifriction bearing;

an outer grease holding chamber formed in the side of said outer bearing cover facing to said antifriction bearing;

at least one worn grease containing chamber formed in the same side of said outer bearing cover as said outer grease holding chamber and and extending continuously therefrom horizontally and tangentially to said rotary shaft toward the outer periphery of said outer bearing cover, the bottom surface of said worn grease containing chamber being situated so as to apply the remaining base oil therein onto the inner surface of said outer race; a partition wall disposed between said outer grease holding chamber and said worn grease containing chamber.

* * * * *